G. H. DOW.
Horse Hay Fork.

No. 84,271.                                Patented Nov. 24, 1868.

Inventor.
G. H. Dow

Witnesses.
J. H. Burridge
E. E. Waite

GEORGE H. DOW, OF FREEPORT, ILLINOIS.

*Letters Patent No. 84,271, dated November 24, 1868.*

IMPROVEMENT IN HORSE HAY-FORKS.

The Schedule referred to in these Letters Patent and making part of the same.

*To all whom it may concern:*

Be it known that I, GEORGE H. DOW, of Freeport, in the county of Stephenson, and State of Illinois, have invented certain new and useful Improvements in Horse Hay-Forks; and I do hereby declare that the following is a full and complete description of the same, reference being had to the accompanying drawings, making a part of this specification, in which—

Figure 1:
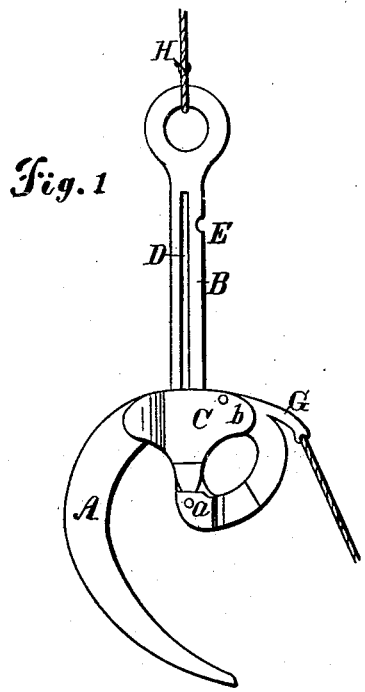
Figure 2:
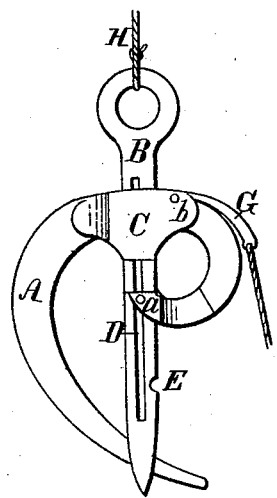

Figures 1 and 2 are side views of the fork.

Like letters of reference refer to like parts in the several views.

The nature of this invention relates to a horse hay-fork, constructed with a single curvilineal tine, and provided with a straight central prong, whereby the hay is held upon the curved tine in the manner as hereinafter described.

In fig. 1, A represents the curvilineal tine, and B, the prong. Said prong is attached to the bow of the tine by means of a stay, C, in which it slides upward and downward, as and for a purpose hereinafter shown.

In the side of the prong is cut a groove, D, into which projects a pin, $a$, whereby the prong is held steadily in position, and, furthermore, secured to the tine.

In the edge of the upper end of the prong is cut a notch, E, and in the edge of the lower end a notch, F, in which the short end of the lever G falls, said lever being pivoted to the bow of the tine at the point $b$, and whereby the fork is locked when charged with hay, &c.

The practical operation of this fork is as follows, viz:

It is suspended over the load by a rope, H, connected to an arrangement of pulleys for hoisting the loaded fork.

The fork is drawn down and thrust into the load when arranged as shown in fig. 1, in which it will be seen that the prong is drawn up away from the point of the tine, and is secured thus by the end of the lever G caught in the lower notch referred to.

The tine being worked down into the hay, the prong is then released and forced down into the hay, until it reaches the point of the tine, as shown in fig. 2, and in this position is locked by the end of the lever dropping into the upper notch E.

The hay thus caught on the tine, and secured thereto by the prong, is drawn up by the pulleys, and conveyed over to the place of deposit, and there dropped by tripping the fork, by simply drawing upward the outer end of the lever G, which will disengage the short end from the notch, allowing the tine to drop down and the hay to slide therefrom, the fork thus assuming the condition first described, and shown in fig. 1, ready to be again drawn down and thrust into the hay as before, and the operation of elevating and discharging again repeated.

A fork thus constructed is simple in its mechanism, and therefore not liable to get out of order. It is easily handled, and certain in its operation.

What I claim as my invention, and desire to secure by Letters Patent, is—

The curvilineal tine A, in combination with the prong B, in the manner as and for the purpose set forth.

GEORGE H. DOW.

Witnesses:
R. N. ANKENY,
E. H. GREENE.